United States Patent [19]
Scharkowski

[11] Patent Number: 5,922,438
[45] Date of Patent: Jul. 13, 1999

[54] HONEYCOMB-STRUCTURE HOLLOW BODIES OF PLASTIC, PREFERABLY POLYOLEFINS

[75] Inventor: Jürgen Scharkowski, Mogendorf, Germany

[73] Assignee: Steuler Industriewerke GmbH, Germany

[21] Appl. No.: 08/592,321

[22] PCT Filed: Aug. 4, 1994

[86] PCT No.: PCT/EP94/02590

§ 371 Date: Mar. 14, 1996

§ 102(e) Date: Mar. 14, 1996

[87] PCT Pub. No.: WO95/04649

PCT Pub. Date: Feb. 16, 1995

[30] Foreign Application Priority Data

Aug. 4, 1993 [DE] Germany ............... 43 26 189

[51] Int. Cl.⁶ .................................................. B32B 3/12
[52] U.S. Cl. ..................................... 428/116; 428/118
[58] Field of Search ........................... 428/116, 118

[56] References Cited

U.S. PATENT DOCUMENTS

| | | | |
|---|---|---|---|
| 3,379,594 | 4/1968 | Bruder | 428/116 X |
| 3,793,802 | 2/1974 | Hardt | 428/118 X |
| 4,155,792 | 5/1979 | Gelhaar et al. | 428/118 X |
| 4,231,186 | 11/1980 | Ruuska | 428/118 X |
| 4,832,999 | 5/1989 | Sweet | 428/116 |
| 4,879,152 | 11/1989 | Green | 428/116 X |
| 4,937,125 | 6/1990 | Sanmartin et al. | 428/116 |
| 4,948,681 | 8/1990 | Zagrodnik et al. | |
| 5,152,081 | 10/1992 | Hallenbeck et al. | 428/116 X |
| 5,174,049 | 12/1992 | Flemming | |

OTHER PUBLICATIONS

Derwent Abstract of Japanese Pat. Publication No. 3—248835 of Nov. 1991.

Primary Examiner—Henry F. Epstein
Attorney, Agent, or Firm—Ohlandt, Greeley, Ruggiero & Perle, L.L.P.; George W. Rauchfuss, Jr.

[57] ABSTRACT

A honeycomb-shaped hollow body of plastic, preferably polyolefins, is provided which is composed of individually interconnected plastics components produced by injection molding. The advantages of the invention lie in a hollow body structure having a stable shape, low stress and accurate dimensions.

14 Claims, 4 Drawing Sheets

HONEYCOMB-STRUCTURE HOLLOW BODIES OF PLASTIC, PREFERABLY POLYOLEFINS

FIELD OF THE INVENTION

The present invention relates to a honeycomb-shaped hollow body of plastic, preferably polyolefins.

BACKGROUND TO THE INVENTION

The production of hollow bodies in the form of honeycombs is known. For this purpose, specifically profiled plastic pipes or profiles are connected in such a way that a cross-sectional honeycomb structure is produced which may have a diameter and length of several meters. These hollow bodies are mainly used for gas purification in which the air volume is axially passed through the honeycombs resulting in a substantial enlargement of the contact and exchange surface between the gas and the pipe wall.

Particular fields of application for hollow bodies of this type are so-called wet-type electrostatic filters in which harmful substances passing through the honeycomb pipes are deposited at the walls via a voltage field produced by center electrodes. The material used for structures of this type has to meet high requirements in view of the chemical and thermal stresses during the process and the required resistance to electric flashovers or arcings which are possible in the high-voltage field.

At present, the prior art publications describe the production of honeycomb structures of the above mentioned type on the basis of PVC, extruded hexagon pipes or edged PVC sheets being connected so as to form hexagonal honeycomb structures. The characterizing feature of these structures is the fact that, in order to save space, the walls of the honeycomb structure are adjacent to each other without leaving a space. In practice, this is effected by bonding the honeycomb pipes. As a result, the hollow body has a very stable shape which is typical for honeycomb structures and guarantees the narrow dimensional tolerances required for wet-type electrostatic filters when various thermal and mechanical stresses occur.

A honeycomb structure of this type is disclosed in DE-A1-41 02 732.

Polyvinyl chloride is a particularly suitable material for this honeycomb structure since, in addition to the chemical resistance, it guarantees a high dimensional stability and the capability of being bonded which is a prerequisite for the production.

On the other hand, the durability of wet-type electrostatic filters is restricted by the fact that voltage flashovers from the centrically arranged electrodes to the PVC walls cannot be excluded, resulting in considerable local burning of the walls.

It turned out that the plastics material polypropylene does not have this considerable drawback of the PVC. However, despite this advantage, this material has specific drawbacks as regards its processing into honeycomb structures. In particular, polypropylene has a low dimensional stability under the influence of heat due to the high memory effect in connection with the very high thermal expansion coefficient of the material.

A further disadvantage of PVC is its problematic production and disposal from the environmental point of view.

In contrast to this, the production, processing and disposal of polypropylene is uncomplicated because it is not harmful to the environment.

However, extruded profiled pipes and hot-formed or edged and welded polypropylene profiles which can be used for producing honeycomb structures exhibit high internal stresses resulting in considerable dimensional stability problems when they are processed into honeycomb structures.

A further drawback of the material polypropylene is the fact that it cannot be bonded. As a consequence, the usual prior art production methods are ruled out.

DE-B2 26 41 114 discloses a method of producing a plastic electrostatic filter in honeycomb form. The honeycombs are composed of hot-pressed plate strips in the form of sheet-piling which consist of glass-reinforced polyester. Glass-reinforced polyester was selected because PVC shows too high relaxation effects in case of temperature stress. In order to prevent the drawbacks of pure plastics, this known method uses glass-reinforced polyester.

EP-A2-0 153 681 discloses a method of producing three-dimensional transparent honeycomb structures of plastics. In this publication, plastic films or plates are formed into rib-like structures by heat-forming or deep-drawing. Subsequently, the films or plates produced are stacked upon another to form a honeycomb structure.

It is known per se from Kunststoff-Lexikon ("Manual of Plastics") (published by Carl Hanser Verlag, Munich, Vienna 1981), page 504, to produce thermoplastic plastics also by injection molding.

DE-C1-41 41 934 relates to an electric separator comprising collecting electrodes arranged in a honeycomb structure.

Said collecting electrodes form a star-shaped component consisting of three wall parts hermetically connected with each other. At the outer edges of each wall part pipe sections are located in the longitudinal direction into which rods are introduced which connect the star-shaped components with each other and thus form a honeycomb structure. The star-shaped components consist of electrically conductive plastics. In this connection, the fact that the components are connected by the pipe sections is considered advantageous because joining processes such as welding or bonding can be dispensed with.

DE-A1-27 25 220 relates to a group of dishes for cultivating and growing plants. In this publication, a basic structure in the form of honeycombs is disclosed whose center part consists of a rotting or decomposing special paper or carton. This allows the honeycomb structure to split up when plants are cultivated.

SUMMARY OF THE INVENTION

In contrast, it is an object of the present invention to provide a honeycomb-shaped hollow plastic body of polyolefins, preferably polypropylene, which removes the problems of dimensional stability and lacking capability of being bonded.

This object is achieved with the features of the claims.

The solution of the invention is based on the idea of providing plastics components produced by injection molding which are connected with each other to a honeycomb pipe preferably by a special welding technique, spot welding being preferred.

The present invention has the following advantages.

Due to the shaping of the plastics components by injection molding, the plastics components which form the honeycomb structure are characterized by low stress and dimensional stability. If required, residual stresses are removed after the injection process by a thermal aftertreatment which does not adversely affect the shape of the components. The production of honeycomb hollow bodies which have a stable shape and accurate dimensions is possible by using the material polypropylene.

BRIEF DESCRIPTION OF THE DRAWINGS

In the following, the invention will be described in more detail with reference to the drawings in which.

DETAILED DESCRIPTION OF THE INVENTION

Figure 1:
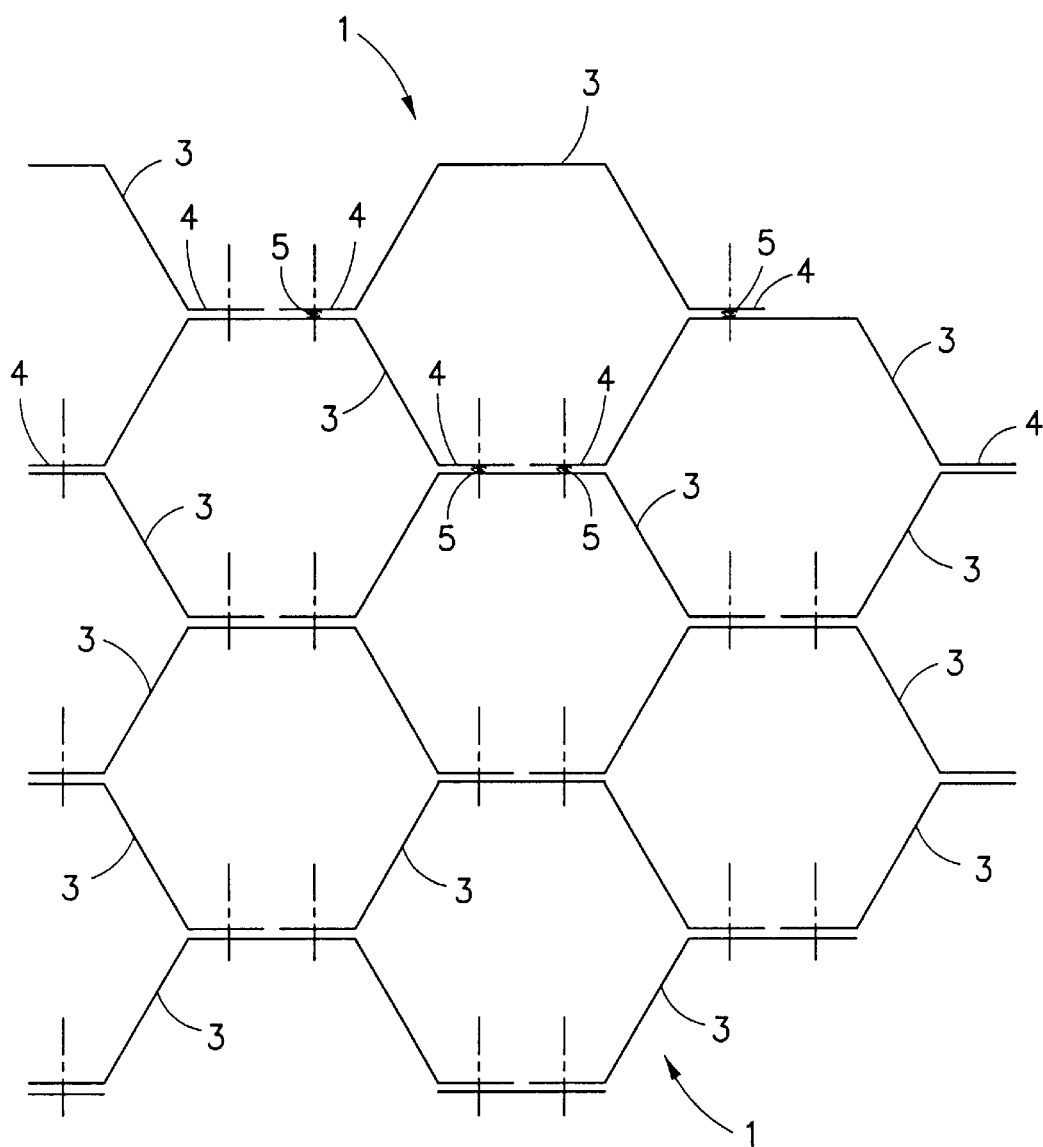
FIG. 1 shows a schematic cross section of an embodiment of the invention along the line I—I in FIG. 4.

A plurality of continuous honeycomb pipes 1 which are held together and supported by a supporting flange (not shown) are combined to a bundle. The continuous honeycomb pipes 1 are composed of individual plastics components (injection molded components) 3 whose arrangement is shown in FIG. 1. The plastics components preferably consist of sections shaped in the form of semi-pipes with connecting flanges 4, respectively. Said plastics components are connected with the adjacent plastics components 3, which are formed in the same way, via the flanges 4 and connecting elements 5 so as to form continuous complete pipes. In the present exemplifying embodiment, the plastics components 3 are formed in such a way that the interconnection of the individual components results in hexagon pipes which, in their entirety, form the honeycomb structure.

Figure 2:
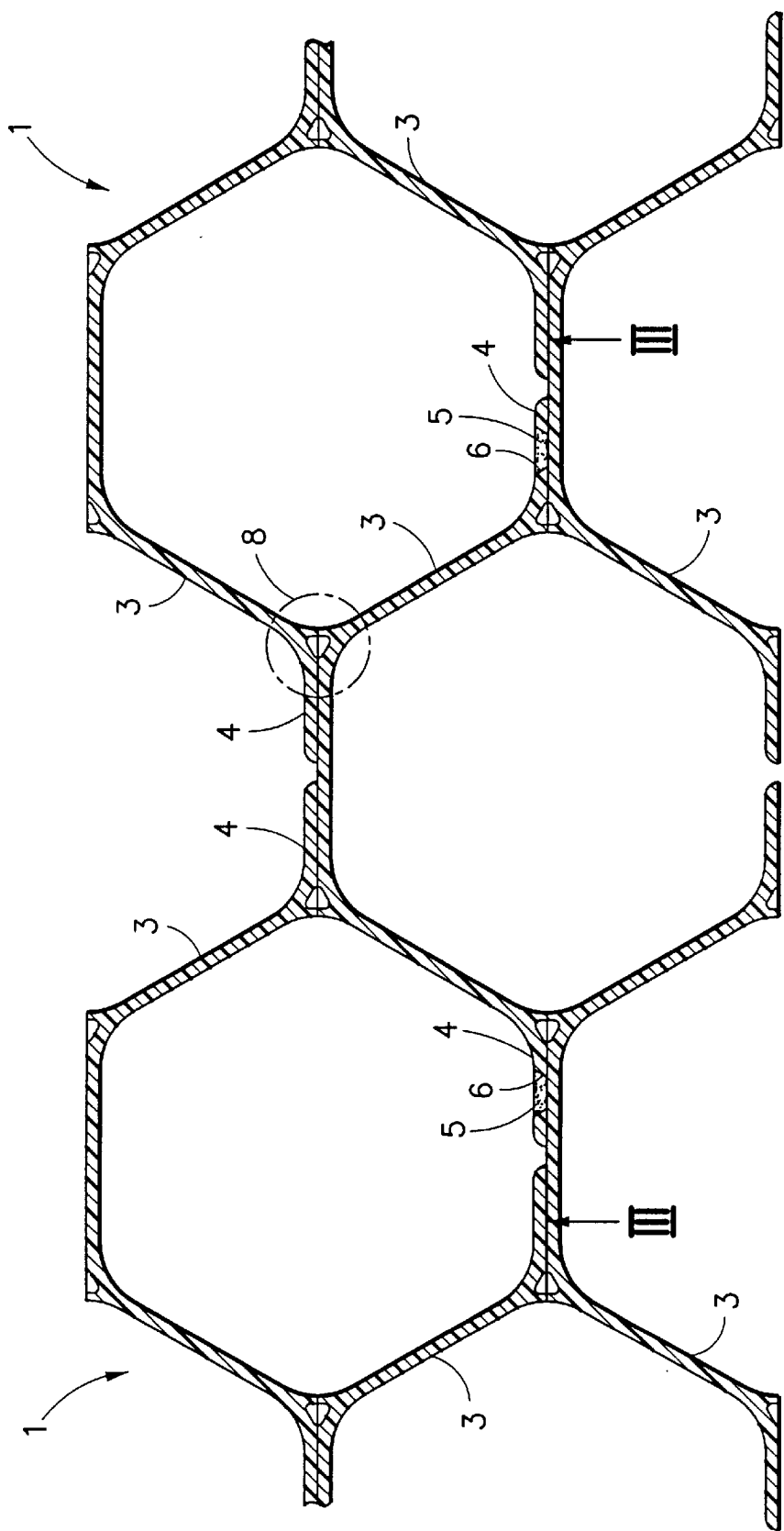
FIG. 2 shows an enlarged cross section according to FIG. 1 with connecting elements.

FIG. 2 shows an enlarged view of the honeycomb structure. The displacement of the individual plastics; components 3 with respect to each other can be recognized, said plastics components being connected at the flanges 4 with other plastics components 3 via connecting elements 5. In this embodiment, the connecting element 5 is realized by a weld joint which is produced in a manner known per se by build-up welding, ultrasonic, spin or friction welding. Said weld joint guarantees a stable honeycomb structure and eliminates the need for the previously known bonding of the parts which cannot be applied in the present case. In addition, the reinforcement 8 of the corners of the honeycomb pipes leads to a particularly high dimensional stability of the honeycomb pipes 1 and thus of the whole structure.

In the case of injection molding, the size of the plastics components is restricted by the possible size of the injection molding dies. Therefore, the injection molded components 3 produced cannot completely correspond to the required height of the honeycomb pipes 1 but must be divided. The restricted dimension of the injection molded components 3 involves the advantage that stresses due to the production are reduced. It is a further advantage that stresses in the material which occur during the joining of the structures can be reduced by using small components. The connecting flanges 4 are provided with openings 6 for establishing an undetachable connection with the adjacent injection molded components 3 by means of the connecting elements 5.

Figure 3:
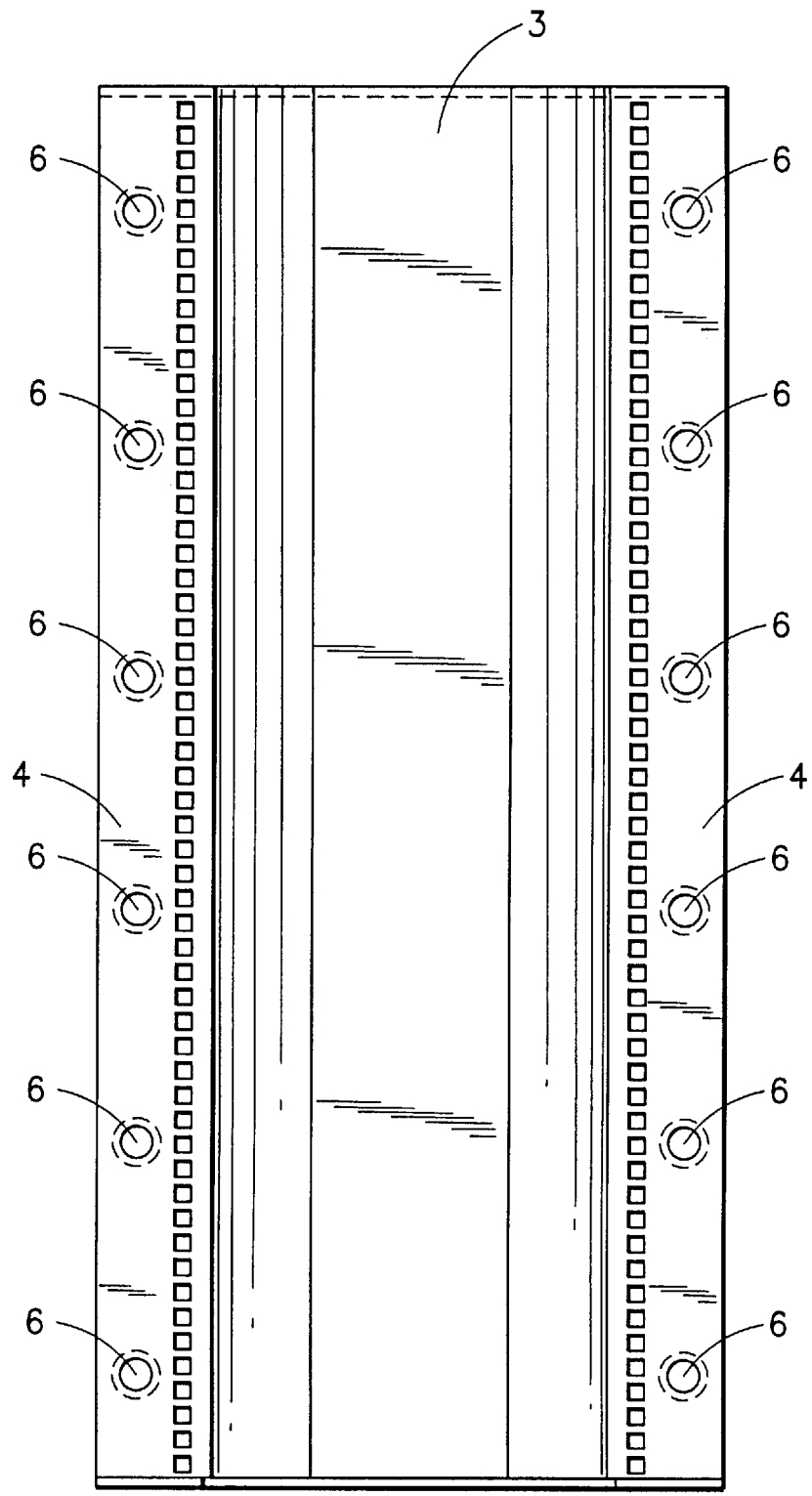
FIG. 3 shows the elevation of an injection molded component according to the section III—III in FIG. 2.

FIG. 3 is a view into a single injection molded component 3 which is cut corresponding to the section A-A' in FIG. 2. The flanges 4 extending along the injection molded components 3 with the openings 6 for the connecting elements are shown.

Figure 4:
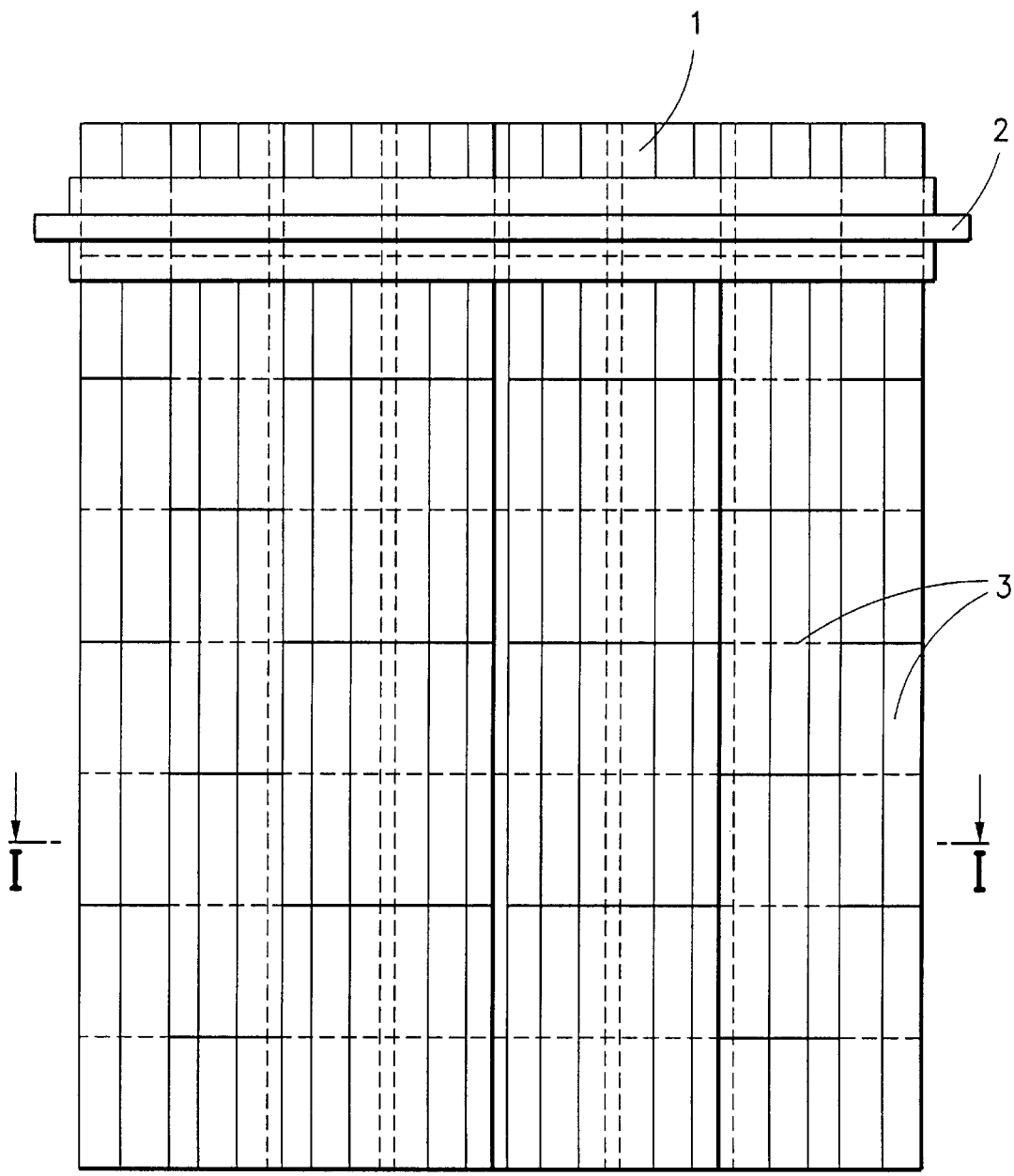
FIG. 4 shows a side view of a pipe bundle having a honeycomb structure.

FIG. 4 is a side view of a pipe bundle consisting of a plurality of honeycombs. The bundle consists of a plurality of continuous honeycomb pipes 1 composed of plastics components 3 which are displaced with respect to each other and held together and supported by a supporting flange 2. The displacement of the plastics components shown in FIG. 4 by thickened lines results in an increased stability of the pipe bundle.

Besides the preferred embodiment of welding, the connecting elements 5 may also be realized by rivets or detachable screw connections.

In the inventive embodiment shown, the honeycomb pipes 1 are composed of two plastics components in the cross section. However, within the scope of the present invention it is also possible to provide honeycomb pipes which consist of more than two plastics components, for instance three or six components, and are connected with other plastics components via flanges, as claimed in the present invention.

I claim:

1. A body having an internal hollow honeycomb structure, wherein the honeycomb structure consists of individual plastics components (3) which are designed such that they form continuous honeycomb pipes (1) in the joined state, characterized in that each of the plastics components (3) is produced by injection molding and is shaped in the form of a semi-pipe with connecting flanges (4).

2. The body according to claim 1, characterized in that the plastics components (3) are made of thermoplastics that can be injection molded.

3. The body according to claim 1, characterized in that the individual plastics components (3) are frictionally and positively connected by connecting elements (5) to form the honeycomb structure.

4. The body according to claim 3, characterized in that the plastics components (3) are offset with respect to their height in connection with the adjacent plastics components (3) and are connected with the latter via the connecting elements (5).

5. The body according to claim 3, characterized in that the plastics components (3) include a reinforcement (8) in their corners which additionally guarantees the dimensional stability.

6. The body according to claim 3, characterized in that the connecting element (5) is a weld joint.

7. The body according to claim 6, characterized in that the weld joint is a spot weld joint.

8. The body according to claim 6, characterized in that the weld joint is produced by build-up welding, ultrasonic, spin or friction welding.

9. The body according to claim 3, characterized in that the connecting element (5) is a removable screw connection.

10. The body according to claim 3 characterized in that the connecting element (5) is a removable connection.

11. The body according to claim 3 characterized in that the connecting element (5) is a screw connection.

12. The body according to claim 1, characterized in that the honeycomb pipes (1) are lengthwise divided corresponding to dimensions of the plastics components (3).

13. The body according to claim 1, characterized in that the connecting flanges (4) are provided with openings (6) through which a connection to the adjacent plastics component (3) is effected.

14. The body according to claim 1, characterized in that the plastics components (3) are made of polyolefins.

* * * * *